(12) United States Patent
Juneja et al.

(10) Patent No.: US 12,262,333 B2
(45) Date of Patent: Mar. 25, 2025

(54) AMPLIFIER ADJUSTMENT TO REDUCE LATENCY

(71) Applicant: QUALCOMM Incorporated, San Diego, CA (US)

(72) Inventors: Raveesh Juneja, Hyderabad (IN); Priyangshu Ghosh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/537,897

(22) Filed: Nov. 30, 2021

(65) Prior Publication Data

US 2023/0171712 A1 Jun. 1, 2023

(51) Int. Cl.
*H04W 52/52* (2009.01)
*H04B 1/04* (2006.01)
*H04W 52/14* (2009.01)
*H04W 52/26* (2009.01)

(52) U.S. Cl.
CPC .............. *H04W 52/52* (2013.01); *H04B 1/04* (2013.01); *H04W 52/146* (2013.01); *H04W 52/267* (2013.01); *H04B 2001/0416* (2013.01)

(58) Field of Classification Search
CPC . H04W 52/52; H04W 52/146; H04W 52/267; H04B 1/04; H04B 2001/0416
See application file for complete search history.

(56) References Cited

U.S. PATENT DOCUMENTS

| 2010/0259330 | A1* | 10/2010 | Nakai ................... H03G 3/001 330/279 |
| 2019/0349239 | A1* | 11/2019 | Lie ........................ H04L 5/0044 |
| 2020/0396696 | A1* | 12/2020 | Hitomi ............... H04W 52/367 |
| 2022/0174784 | A1* | 6/2022 | Ekbatani ............ H04W 84/042 |

* cited by examiner

*Primary Examiner* — John J Lee
(74) *Attorney, Agent, or Firm* — Harrity & Harrity, LLP

(57) ABSTRACT

Various aspects of the present disclosure generally relate to wireless communication. In some aspects, a user equipment (UE) may adjust an amplifier of the UE to a highest gain state after a downlink period and before an uplink period. Additionally, the UE may adjust the amplifier of the UE to a lower gain state after the uplink period and before a subsequent downlink period. Numerous other aspects are described.

26 Claims, 9 Drawing Sheets

AMPLIFIER ADJUSTMENT TO REDUCE LATENCY

FIELD OF THE DISCLOSURE

Aspects of the present disclosure generally relate to wireless communication and to techniques and apparatuses for adjusting a user equipment amplifier to reduce latency.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include adjusting an amplifier of the UE to a highest gain state after a downlink period and before an uplink period. The method may further include adjusting the amplifier of the UE to a lower gain state after the uplink period and before a subsequent downlink period.

Some aspects described herein relate to an apparatus for wireless communication at a UE. The apparatus may include a memory and one or more processors coupled to the memory. The memory may store instructions executable by the one or more processors to cause the UE to adjust an amplifier of the UE to a highest gain state after a downlink period and before an uplink period. The memory may further store instructions executable by the one or more processors to cause the UE to adjust the amplifier of the UE to a lower gain state after the uplink period and before a subsequent downlink period.

Some aspects described herein relate to an apparatus for wireless communication. The apparatus may include means for adjusting an amplifier of the apparatus to a highest gain state after a downlink period and before an uplink period. The apparatus may further include means for adjusting the amplifier of the apparatus to a lower gain state after the uplink period and before a subsequent downlink period.

Some aspects described herein relate to a non-transitory computer-readable medium that stores one or more instructions for wireless communication by a UE. The one or more instructions, when executed by one or more processors of the UE, may cause the UE to adjust an amplifier of the UE to a highest gain state after a downlink period and before an uplink period. The one or more instructions, when executed by one or more processors of the UE, may further cause the UE to adjust the amplifier of the UE to a lower gain state after the uplink period and before a subsequent downlink period.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
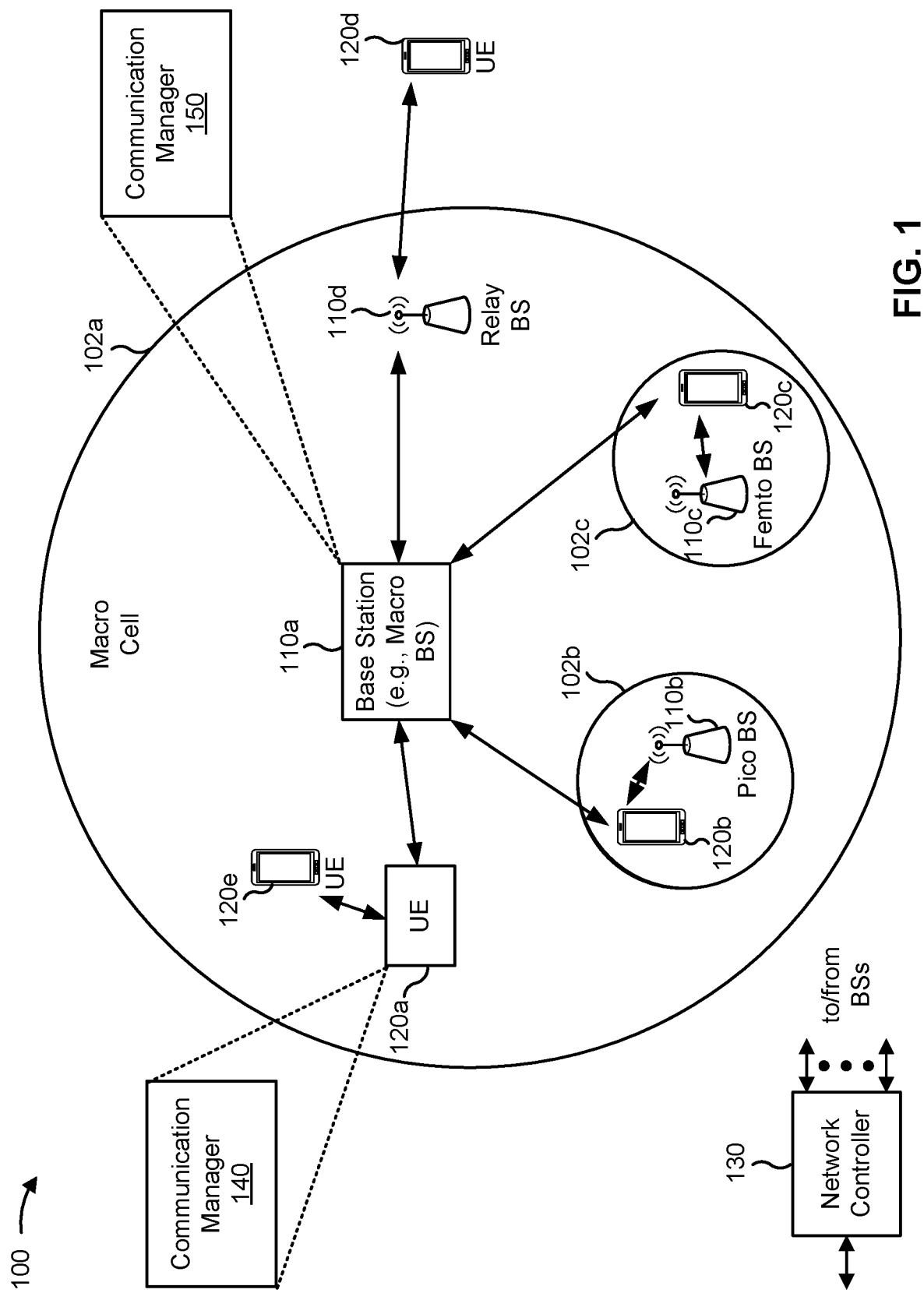
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may adjust an amplifier of the UE 120 to a highest gain state after a downlink period and before an uplink period and adjust the amplifier of the UE 120 to a lower gain state after the uplink period and before a subsequent downlink period. Additionally, or alternatively, the communication manager 140 may perform one or more other operations described herein.

In some aspects, the base station 110 may include a communication manager 150. As described in more detail elsewhere herein, the communication manager 150 may receive an indication of a capability associated with an amplifier of the UE 120 and, based on the indication, refrain from scheduling a transmission. Additionally, or alternatively, the communication manager 150 may perform one or more other operations described herein.

As indicated above, FIG. 1 is provided as an example. Other examples may differ from what is described with regard to FIG. 1.

Figure 2:
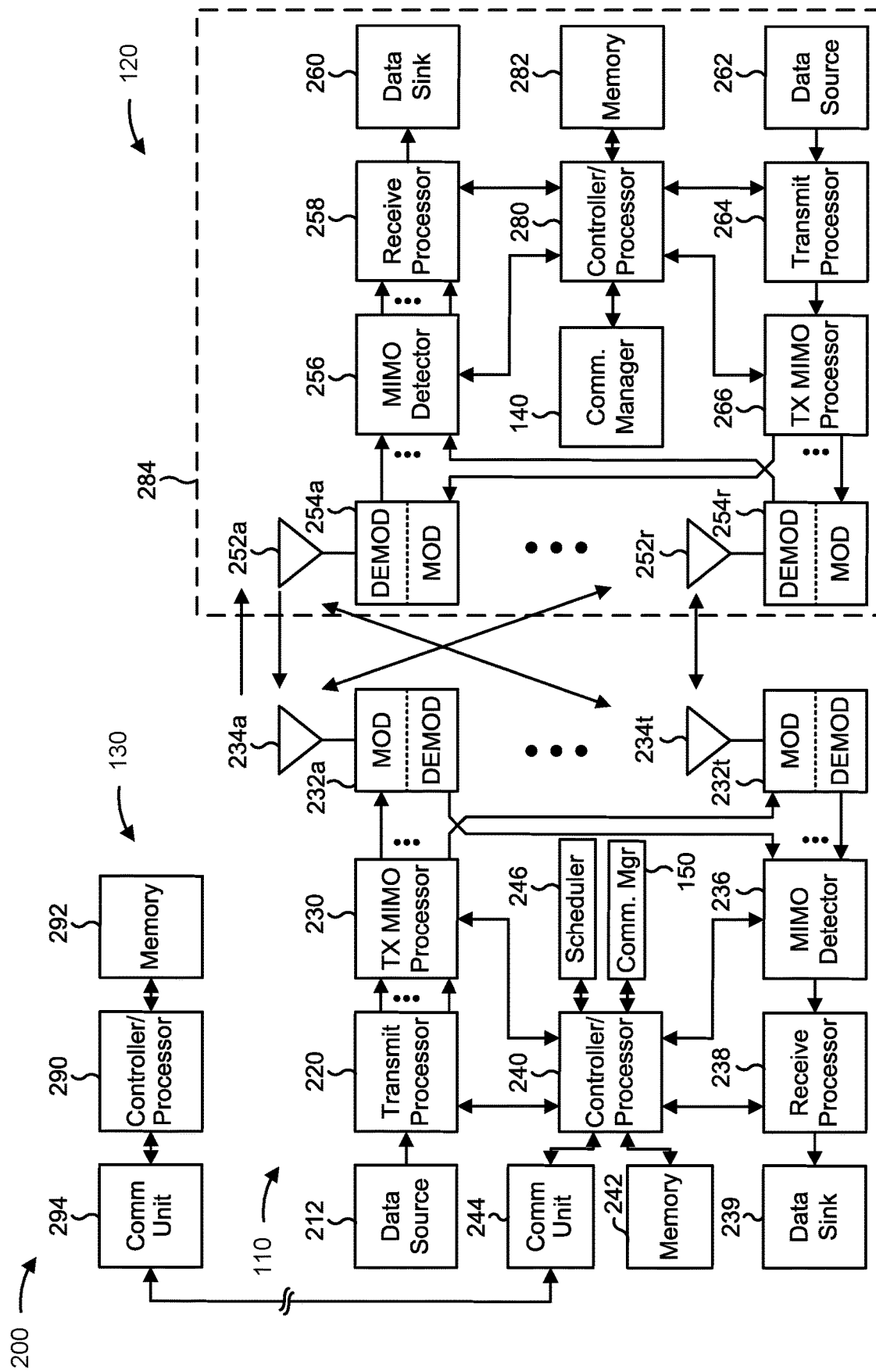
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with adjusting a UE amplifier to reduce latency, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 700 of FIG. 7) may include means for adjusting an amplifier of the UE to a highest gain state after a downlink period and before an uplink period; and/or means for adjusting the amplifier of the UE to a lower gain state after the uplink period and before a subsequent downlink period. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110 and/or apparatus 800 of FIG. 8) may include means for receiving an indication of a capability associated with an amplifier of a UE (e.g., the UE 120 and/or apparatus 700 of FIG. 7); and/or means for refraining from scheduling a transmission based on the indication. In some aspects, the means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
FIG. 3 is a diagram illustrating an example of a set of slots, in accordance with the present disclosure.

FIG. 3 is a diagram illustrating an example 300 of a set of slots, in accordance with the present disclosure. As shown in FIG. 3, example 300 includes a set of slots 301 that includes at least a first slot (e.g., represented by n) and a subsequent slot (e.g., represented by n+1). As used herein, "slot" may refer a portion of a radio frame (or a subframe) within an LTE, 5G, or other wireless communication structure. In some aspects, a slot may include one or more symbols. Moreover, "symbol" may refer to an OFDM symbol or another similar symbol within a slot. Although described herein with respect to two slots, the description similarly applies to additional slots (e.g., three slots, four slots, and so on).

As further shown in FIG. 3, each slot includes a plurality of symbols. Although depicted with fourteen symbols in each slot, other aspects may include fewer symbols (e.g., thirteen symbols, twelve symbols, and so on) or additional symbols (e.g., fifteen symbols, sixteen symbols, and so on) in each slot. Each symbol may be allocated (e.g., by a base station, such as base station 110) as a downlink symbol (shown as "D" in FIG. 3) for transmissions from the base station 110 to a UE (e.g., UE 120), as an uplink symbol (shown as "U" in FIG. 3) for transmissions from the UE 120 to the base station 110, or as a flexible symbol (shown as "F" in FIG. 3) for either transmissions from the UE 120 to the base station 110 or transmissions from the base station 110 to the UE 120.

Accordingly, as shown in FIG. 3, the UE 120 may transition from downlink periods (e.g., including one or more downlink symbols, optionally with one or more flexible symbols) to uplink periods (e.g., including one or more uplink symbols, optionally with one or more flexible symbols) and from uplink periods to downlink periods. In example 500, the UE 120 transitions within a slot, but the UE 120 may additionally or alternatively transition at a slot boundary.

In some cases, a UE may be allocated (e.g., by a base station) more downlink symbols than uplink symbols. For example, the UE may execute a downlink-heavy application, such as a mobile game, a video player, another multimedia player, or another application that relies on large amounts of downlink data. Additionally, or alternatively, the UE may execute an application sensitive to downlink latency.

During downlink reception, the UE applies at least one amplifier, such as a low-noise amplifier (LNA), to an analog signal received at one or more antennas of the UE in order to improve chances of successful filtering, demodulation, and decoding. However, the LNA is powered off during uplink transmission in order to reduce distortion in uplink signals transmitted using the antenna(s) and to conserve power at the UE.

However, an LNA may consume an average of 20 microseconds (μs) and a maximum of 300 μs when the LNA is powered on. This creates latency during transition from an uplink period to a downlink period and can result in the UE failing to properly receive, filter, demodulate, and decode one or more initial symbols during the downlink period.

Some techniques and apparatuses described herein enable a UE (e.g., the UE 120) to transition an LNA from a lower gain state during a downlink period (e.g., used to improve downlink reception) to a highest gain state during an uplink period and back to the lower gain state during a subsequent downlink period. For example, the LNA may consume an average of 2 μs and a maximum of 5 μs during a gain state transition. As a result, latency between the uplink period and the subsequent downlink period is reduced without significant increases in power consumption or distortion of signals.

As indicated above, FIG. 3 is provided as an example. Other examples may differ from what is described with respect to FIG. 3.

Figure 4A:
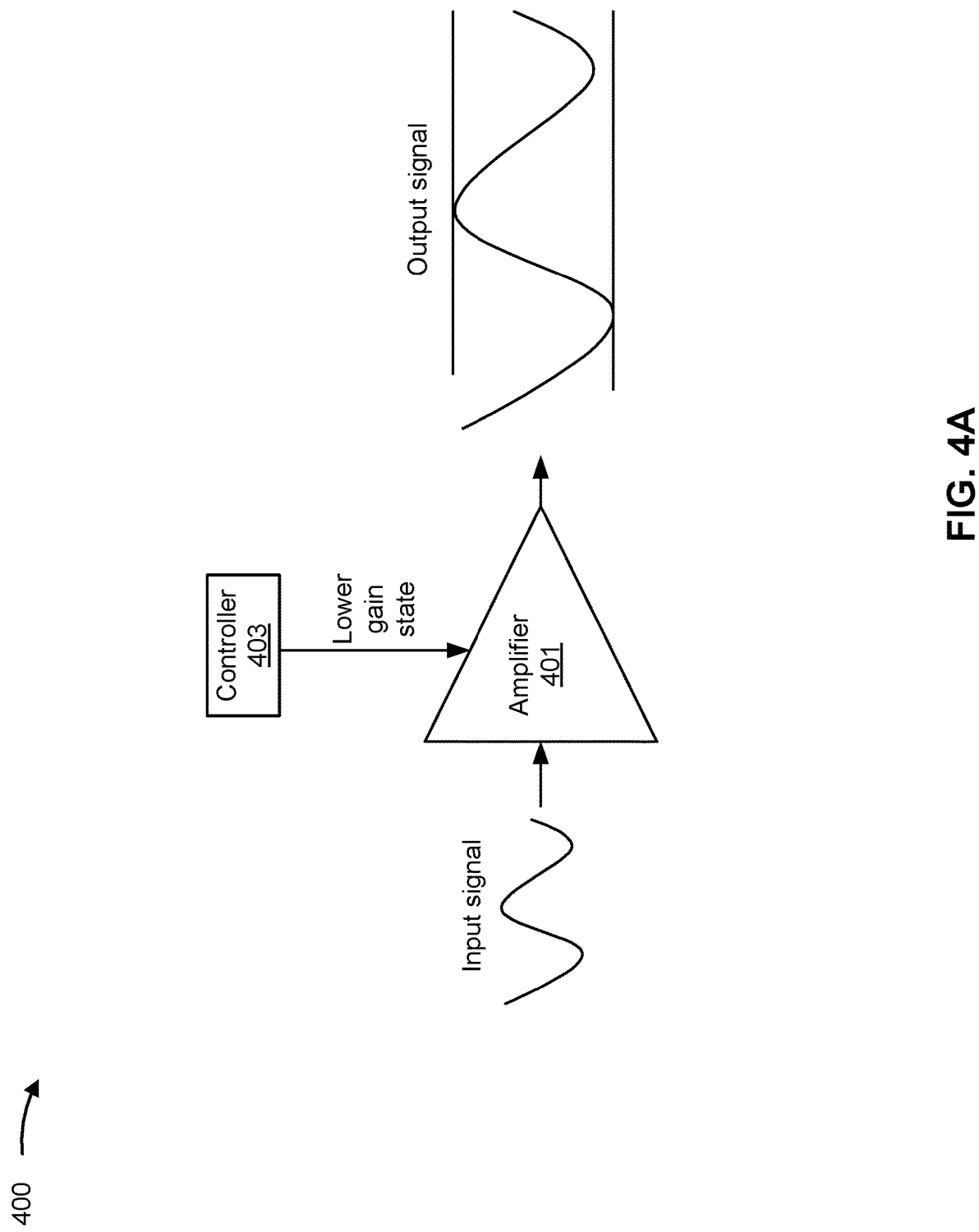
FIGS. 4A and 4B are diagrams illustrating examples of amplifier states for a UE, in accordance with the present disclosure.
Figure 4B:
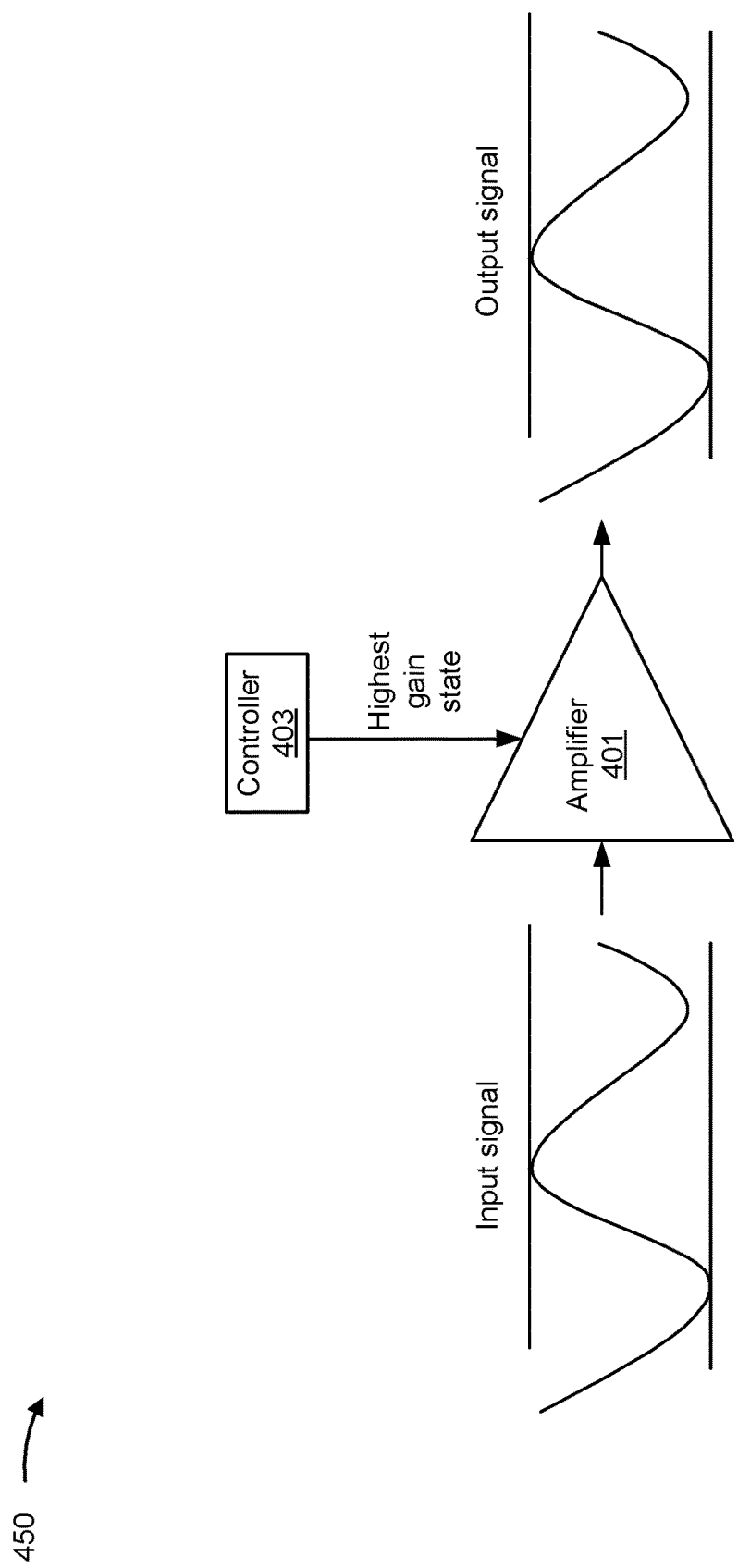

FIGS. 4A and 4B are diagrams illustrating examples 400 and 450, respectively, of amplifier states for a UE, in accordance with the present disclosure. As shown in FIGS. 4A and 4B, an amplifier 401 (e.g., an LNA) of a UE (e.g., a cellular phone, such as a smart phone, a laptop computer, a tablet, and/or another UE) may amplify analog signals from one or more antennas of the UE. The amplifier may be associated with different gain states.

FIG. 4A shows an example of a lower gain state for the amplifier 401. Accordingly, in example 400, a controller 403 (e.g., a microprocessor) instructs the amplifier 401 to apply the lower gain state, and the amplifier 401 therefore amplifies analog signals from the antenna(s) as shown.

FIG. 4B shows an example of a highest gain state for the amplifier 401. Accordingly, in example 400, the controller 403 instructs the amplifier 401 to apply the highest gain state, and the amplifier 401 therefore does not significantly alter analog signals from the antenna(s) as shown.

By controlling the gain state of the amplifier 401 (e.g., as described in connection with FIG. 5), the UE can reduce latency between an uplink period and a subsequent downlink period without significant increases in power consumption or distortion of uplink signals.

As indicated above, FIGS. 4A and 4B are provided as examples. Other examples may differ from what is described with respect to FIGS. 4A and 4B.

Figure 5:
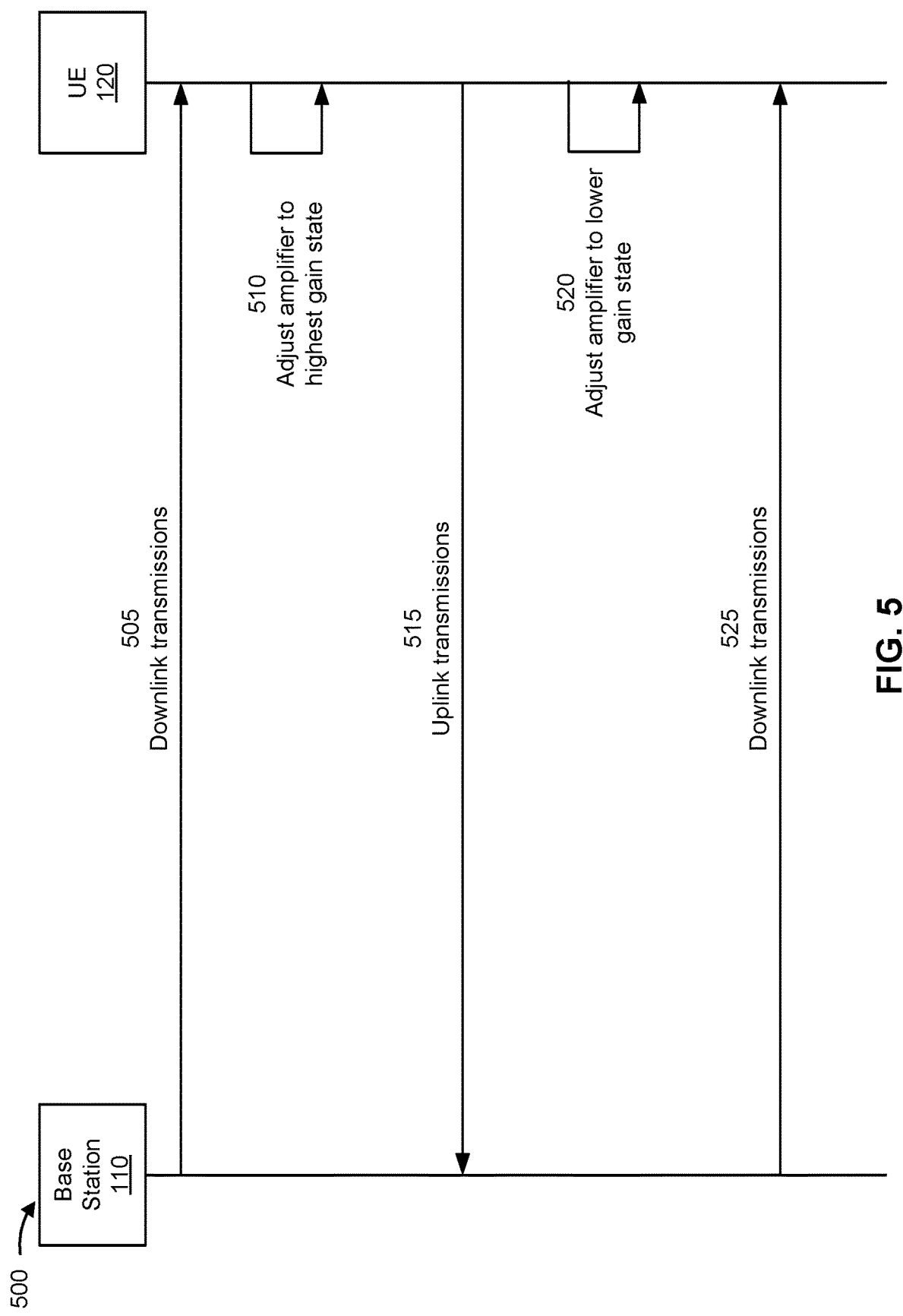
FIG. 5 is a diagram illustrating an example associated with adjusting a UE amplifier to reduce latency, in accordance with the present disclosure.

FIG. 5 is a diagram illustrating an example 500 associated with adjusting a UE amplifier to reduce latency, in accordance with the present disclosure. As shown in FIG. 5, a base station 110 and a UE 120 may communicate with one another. The base station 110 may be included in a wireless network, such as wireless network 100 of FIG. 1. The UE 120 may include a cellular phone, such as a smart phone, a laptop computer, a tablet, and/or another type of mobile station.

As shown by reference number 505, the base station 110 may transmit, and the UE 120 may receive, during a downlink period. For example, the base station 110 may transmit reference signals, control information, data, and/or other downlink communications to the UE 120.

In some aspects, the downlink period includes one or more downlink symbols within at least one slot (e.g., as described in connection with FIG. 3). Additionally, or alternatively, the downlink period includes at least one flexible symbol within at least one slot (e.g., as described in connection with FIG. 3).

As shown by reference number 510, the UE 120 may adjust an amplifier of the UE 120 to a highest gain state after the downlink period and before an uplink period. For example, a microprocessor or other controller of the UE 120 may instruct the amplifier to transition to the highest state (e.g., as described in connection with FIG. 4B). The UE 120 may determine when the downlink period transitions to the uplink period based on a radio resource control (RRC) message, a medium access control (MAC) control element (MAC-CE), and/or downlink control information (DCI) from the base station 110.

In some aspects, the amplifier is adjusted to the highest gain state after a final symbol of the downlink period. For example, the UE 120 may use a gap symbol between the downlink period and before the uplink period to transition the amplifier. As an alternative, the UE 120 may use a cyclic prefix (CP) portion of an initial symbol in the uplink period to transition the amplifier. As an alternative, the amplifier is adjusted to the highest gain state during a flexible symbol between the downlink period and the uplink period.

In some aspects, the base station 110 may not schedule a transmission during the flexible symbol between the downlink period and the uplink period and/or the initial symbol of the uplink period. Additionally, or alternatively, the UE 120 may determine that the base station 110 has not scheduled a transmission during a final symbol (optionally with a penultimate symbol) of the downlink period. Accordingly, the UE 120 may use the final symbol (optionally with the penultimate symbol) of the downlink period to transition the amplifier.

As shown by reference number 515, the UE 120 may transmit, and the base station 110 may receive, during the uplink period. For example, the UE 120 may transmit reference signals, control information, data, and/or other uplink communications to the base station 110.

In some aspects, the uplink period includes one or more downlink symbols within at least one slot (e.g., as described in connection with FIG. 3). Additionally, or alternatively, the uplink period includes at least one flexible symbol within at least one slot (e.g., as described in connection with FIG. 3).

As shown by reference number 520, the UE 120 may adjust the amplifier of the UE 120 to a lower gain state after the uplink period and before a subsequent downlink period. For example, a microprocessor or other controller of the UE 120 may instruct the amplifier to transition to the lower state (e.g., as described in connection with FIG. 4A). The UE 120 may determine when the uplink period transitions to the subsequent downlink period based on an RRC message, a MAC-CE, and/or DCI from the base station 110.

In some aspects, the amplifier is adjusted to the lower gain state after a final symbol of the uplink period. For example, the UE 120 may use a gap symbol between the uplink period and before the subsequent downlink period to transition the amplifier. As an alternative, the UE 120 may use a CP portion of an initial symbol in the subsequent downlink period to transition the amplifier. As an alternative, the amplifier is adjusted to the lower gain state during a flexible symbol between the uplink period and the subsequent downlink period.

In some aspects, the base station 110 may not schedule a transmission during the flexible symbol between the uplink period and the subsequent downlink period and/or the initial symbol of the subsequent downlink period. Additionally, or alternatively, the UE 120 may determine that the base station 110 has not scheduled a transmission during a final symbol (optionally with a penultimate symbol) of the uplink period. Accordingly, the UE 120 may use the final symbol (optionally with the penultimate symbol) of the uplink period to transition the amplifier.

As shown by reference number 525, the base station 110 may transmit, and the UE 120 may receive, during a downlink period. For example, the base station 110 may transmit reference signals, control information, data, and/or other downlink communications to the UE 120. A latency associated with reception at the UE 120 is reduced by adjusting the amplifier to the lower gain state, as described in connection with reference number 520.

In some aspects, the subsequent downlink period includes one or more downlink symbols within at least one slot (e.g., as described in connection with FIG. 3). Additionally, or alternatively, the subsequent downlink period includes at least one flexible symbol within at least one slot (e.g., as described in connection with FIG. 3).

By using techniques as described in connection with FIG. 5, the UE 120 reduces latency between the uplink period and the subsequent downlink period without significant increases in power consumption or distortion of uplink signals.

As indicated above, FIG. 5 is provided as an example. Other examples may differ from what is described with respect to FIG. 5.

Figure 6:
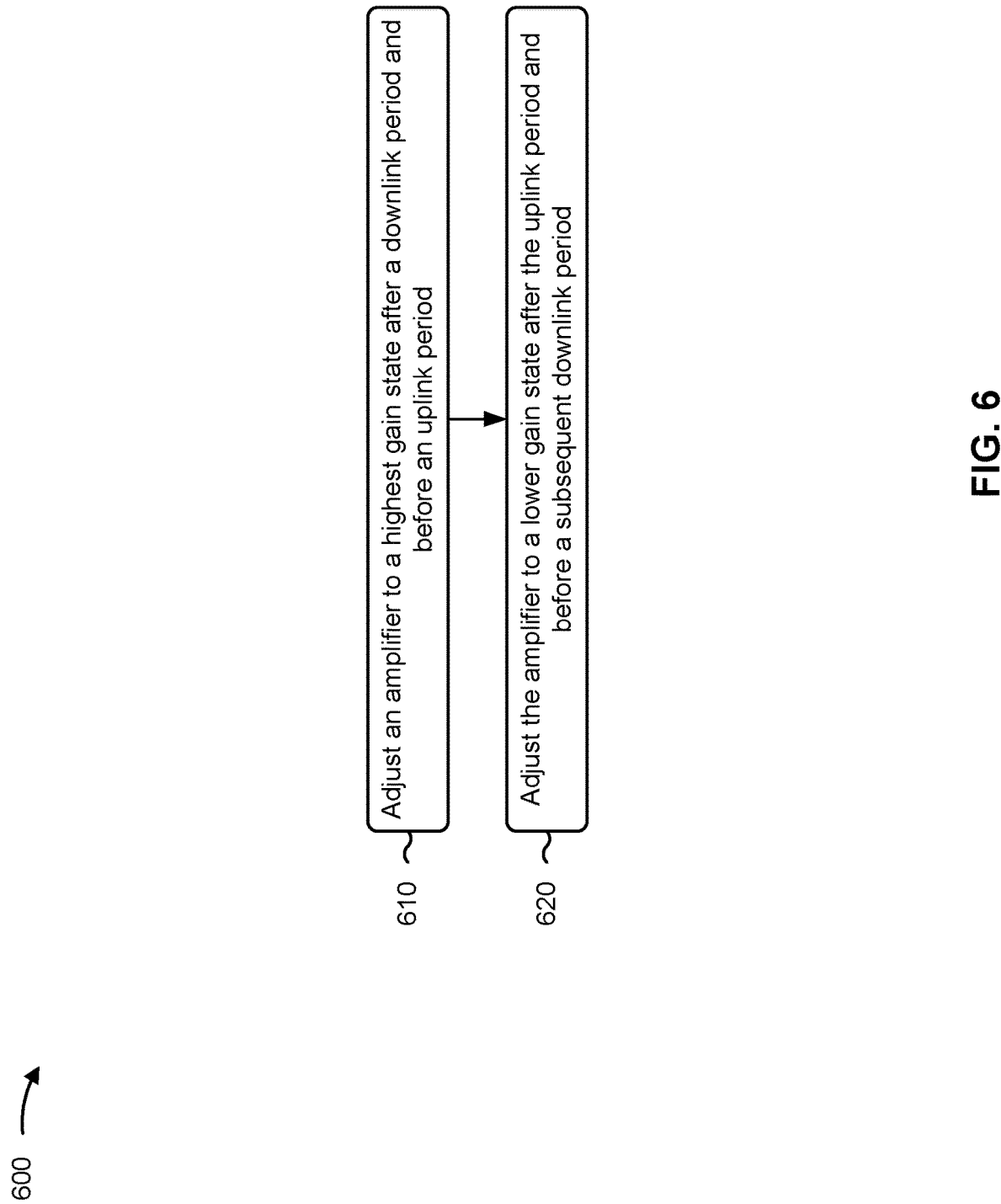
FIG. 6 is a diagram illustrating an example process associated with adjusting a UE amplifier to reduce latency, in accordance with the present disclosure.

FIG. 6 is a diagram illustrating an example process 600 performed, for example, by a UE, in accordance with the present disclosure. Example process 600 is an example where the UE (e.g., UE 120 and/or apparatus 700 of FIG. 7) performs operations associated with adjusting an amplifier to reduce latency.

As shown in FIG. 6, in some aspects, process 600 may include adjusting an amplifier of the UE to a highest gain state after a downlink period and before an uplink period (block 610). For example, the UE (e.g., using communication manager 140 and/or adjustment component 708, depicted in FIG. 7) may adjust an amplifier of the UE to a highest gain state after a downlink period and before an uplink period, as described herein.

As further shown in FIG. 6, in some aspects, process 600 may include adjusting the amplifier of the UE to a lower gain state after the uplink period and before a subsequent downlink period (block 620). For example, the UE (e.g., using communication manager 140 and/or adjustment component 708) may adjust the amplifier of the UE to a lower gain state after the uplink period and before a subsequent downlink period, as described herein.

Process 600 may include additional aspects, such as any single aspect or any combination of aspects described below and/or in connection with one or more other processes described elsewhere herein.

In a first aspect, the amplifier includes an LNA.

In a second aspect, alone or in combination with the first aspect, the downlink period includes one or more downlink symbols within at least one slot.

In a third aspect, alone or in combination with one or more of the first and second aspects, the downlink period includes at least one flexible symbol within at least one slot.

In a fourth aspect, alone or in combination with one or more of the first through third aspects, the uplink period includes one or more uplink symbols within at least one slot.

In a fifth aspect, alone or in combination with one or more of the first through fourth aspects, the uplink period includes at least one flexible symbol within at least one slot.

In a sixth aspect, alone or in combination with one or more of the first through fifth aspects, the amplifier is adjusted to the highest gain state after a final symbol of the downlink period.

In a seventh aspect, alone or in combination with one or more of the first through sixth aspects, the amplifier is adjusted to the highest gain state during a flexible symbol between the downlink period and the uplink period.

In an eighth aspect, alone or in combination with one or more of the first through seventh aspects, the amplifier is adjusted to the lower gain state after a final symbol of the uplink period.

In a ninth aspect, alone or in combination with one or more of the first through eighth aspects, the amplifier is adjusted to the lower gain state during a flexible symbol between the uplink period and the subsequent downlink period.

Figure 7:
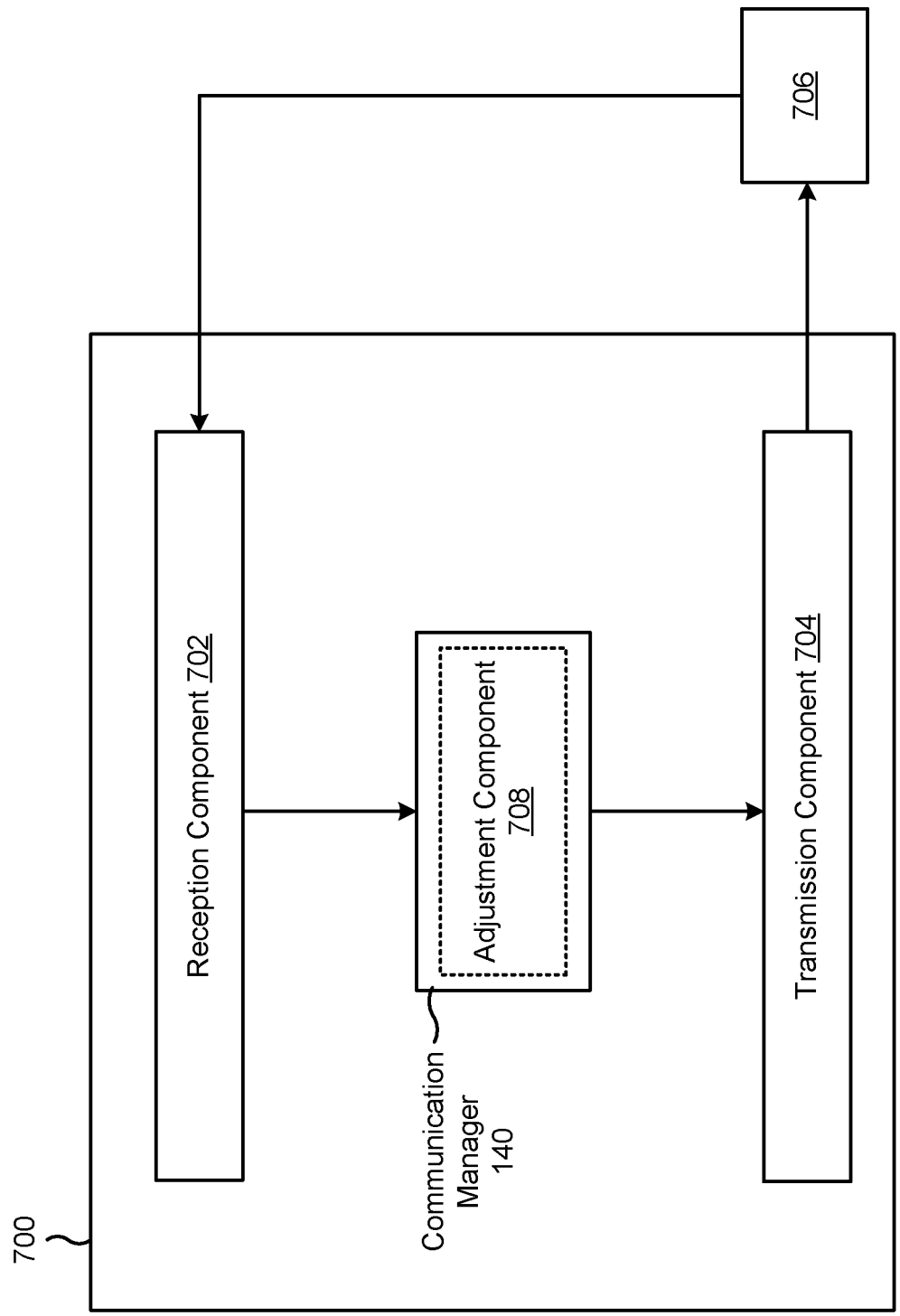
FIGS. 7 and 8 are diagrams of example apparatuses for wireless communication, in accordance with the present disclosure.

In a tenth aspect, alone or in combination with one or more of the first through ninth aspects, process 600 further includes receiving (e.g., using communication manager 140 and/or reception component 702, depicted in FIG. 7) from a base station (e.g., base station 110 and/or apparatus 800 of FIG. 8) during the downlink period.

In an eleventh aspect, alone or in combination with one or more of the first through tenth aspects, process 600 further includes transmitting (e.g., using communication manager 140 and/or transmission component 704, depicted in FIG. 7) to a base station during the uplink period.

In a twelfth aspect, alone or in combination with one or more of the first through eleventh aspects, process 600 further includes receiving (e.g., using communication manager 140 and/or reception component 702) from a base station during the subsequent downlink period, where a latency associated with the receiving is reduced by adjusting the amplifier to the lower gain state.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include an adjustment component 708, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

In some aspects, the adjustment component 708 may adjust an amplifier of the apparatus 700 to a highest gain state after a downlink period and before an uplink period. The adjustment component 708 may include a modem, a modulator, a transmit MIMO processor, a transmit processor, a modulator, a transmit MIMO processor, a transmit processor, a controller/processor, a memory, or a combination thereof, of the UE described in connection with FIG. 2. Additionally, the adjustment component 708 may adjust the amplifier of the apparatus 700 to a lower gain state after the uplink period and before a subsequent downlink period.

In some aspects, the reception component 702 may receive (e.g., form the apparatus 706) during the downlink period. Additionally, or alternatively, the transmission component 704 may transmit (e.g., to the apparatus 706) during the uplink period. Additionally, or alternatively, the reception component 702 may receive (e.g., form the apparatus 706) during the subsequent downlink period. A latency associated with the receiving is reduced by the adjustment component 708 adjusting the amplifier to the lower gain state.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
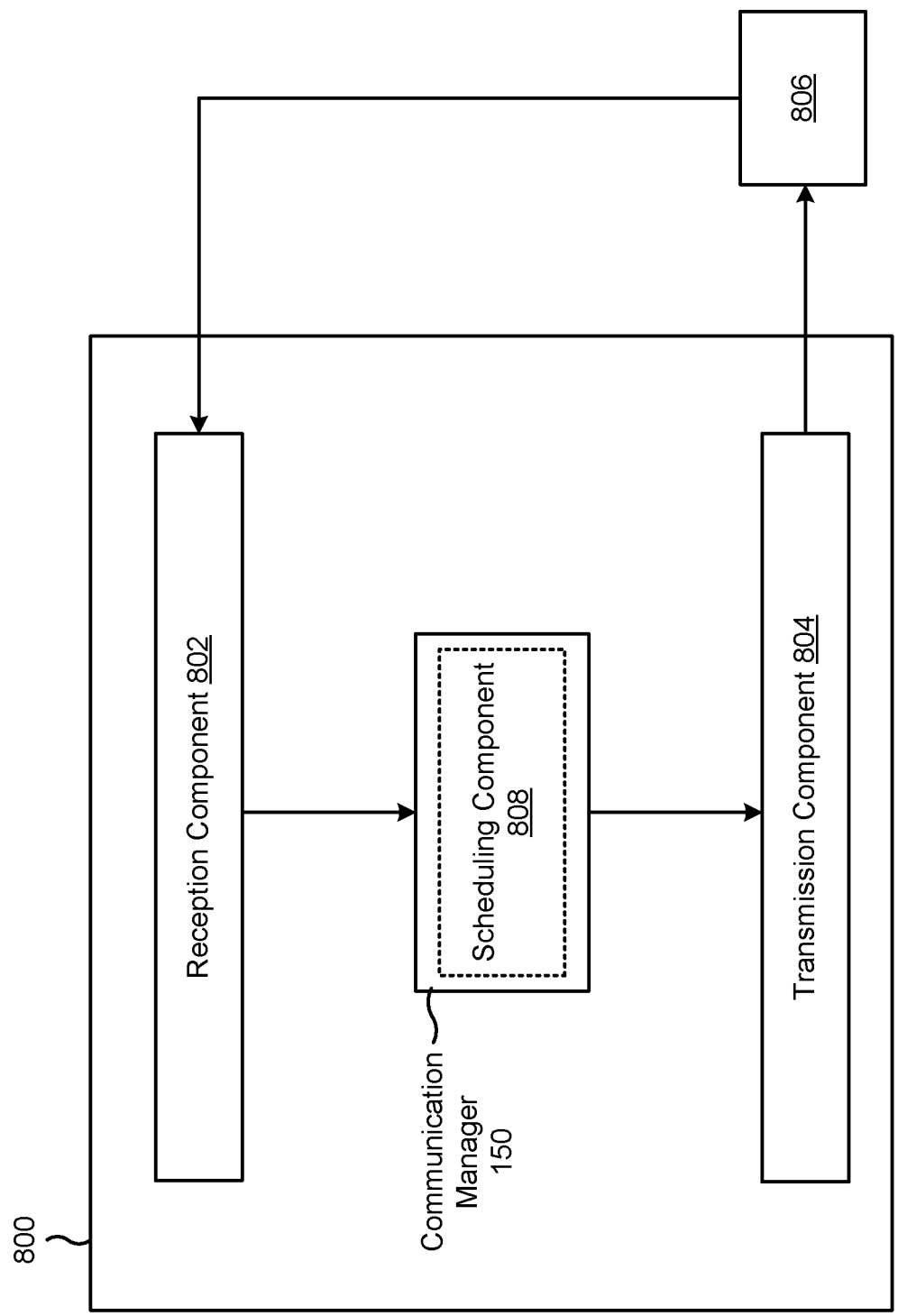

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a scheduling component 808, among other examples.

In some aspects, the apparatus 800 may be configured to perform one or more operations described herein in connection with FIG. 5. Additionally, or alternatively, the apparatus 800 may be configured to perform one or more processes described herein, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

In some aspects, the reception component 802 may receive (e.g., from the apparatus 806), an indication of a capability associated with an amplifier of the apparatus 806. Accordingly, based on the indication, the scheduling component 808 may refrain from scheduling a transmission during a flexible symbol between a downlink period and an uplink period and/or an initial symbol of the uplink period. Additionally, or alternatively, the scheduling component 808 may refrain from scheduling a transmission during a final symbol (optionally with a penultimate symbol) of the downlink period. Accordingly, the apparatus 806 may transition the amplifier during one or more symbols in which the scheduling component 808 did not schedule a transmission.

Additionally, or alternatively, based on the indication, the scheduling component 808 may refrain from scheduling a transmission during a flexible symbol between the uplink period and a subsequent downlink period and/or during an initial symbol of the subsequent downlink period. Additionally, or alternatively, the scheduling component 808 may refrain from scheduling a transmission during a final symbol (optionally with a penultimate symbol) of the uplink period. Accordingly, the apparatus 806 may transition the amplifier during one or more symbols in which the scheduling component 808 did not schedule a transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: adjusting an amplifier of the UE to a highest gain state after a downlink period and before an uplink period; and adjusting the amplifier of the UE to a lower gain state after the uplink period and before a subsequent downlink period.

Aspect 2: The method of Aspect 1, wherein the amplifier comprises a low-noise amplifier (LNA).

Aspect 3: The method of any of Aspects 1 through 2, wherein the downlink period comprises one or more downlink symbols within at least one slot.

Aspect 4: The method of Aspect 3, wherein the downlink period further comprises at least one flexible symbol within the at least one slot.

Aspect 5: The method of any of Aspects 1 through 4, wherein the uplink period comprises one or more uplink symbols within at least one slot.

Aspect 6: The method of Aspect 5, wherein the uplink period further comprises at least one flexible symbol within the at least one slot.

Aspect 7: The method of any of Aspects 1 through 6, wherein the amplifier is adjusted to the highest gain state after a final symbol of the downlink period.

Aspect 8: The method of any of Aspects 1 through 6, wherein the amplifier is adjusted to the highest gain state during a flexible symbol between the downlink period and the uplink period.

Aspect 9: The method of any of Aspects 1 through 8, wherein the amplifier is adjusted to the lower gain state after a final symbol of the uplink period.

Aspect 10: The method of any of Aspects 1 through 8, wherein the amplifier is adjusted to the lower gain state during a flexible symbol between the uplink period and the subsequent downlink period.

Aspect 11: The method of any of Aspects 1 through 10, further comprising: receiving from a base station during the downlink period.

Aspect 12: The method of any of Aspects 1 through 11, further comprising: transmitting to a base station during the uplink period.

Aspect 13: The method of any of Aspects 1 through 12, further comprising: receiving from a base station during the subsequent downlink period, wherein a latency associated with the receiving is reduced by adjusting the amplifier to the lower gain state.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    adjusting an amplifier of the UE to a highest gain state after a downlink period and before an uplink period;
    adjusting the amplifier of the UE to a lower gain state after the uplink period and before a subsequent downlink period; and
    receiving from a base station during the subsequent downlink period,
    wherein a latency associated with the receiving is reduced by adjusting the amplifier to the lower gain state.

2. The method of claim 1, wherein the amplifier comprises a low-noise amplifier (LNA).

3. The method of claim 1, wherein the downlink period comprises one or more downlink symbols within at least one slot.

4. The method of claim 3, wherein the downlink period further comprises at least one flexible symbol within the at least one slot.

5. The method of claim 1, wherein the uplink period comprises one or more uplink symbols within at least one slot.

6. The method of claim 5, wherein the uplink period further comprises at least one flexible symbol within the at least one slot.

7. The method of claim 1, wherein the amplifier is adjusted to the highest gain state after a final symbol of the downlink period.

8. The method of claim 1, wherein the amplifier is adjusted to the highest gain state during a flexible symbol between the downlink period and the uplink period.

9. The method of claim 1, wherein the amplifier is adjusted to the lower gain state after a final symbol of the uplink period.

10. The method of claim 1, wherein the amplifier is adjusted to the lower gain state during a flexible symbol between the uplink period and the subsequent downlink period.

11. The method of claim 1, further comprising:
    receiving from the base station during the downlink period.

12. The method of claim 1, further comprising:
    transmitting to the base station during the uplink period.

13. An apparatus for wireless communication at a user equipment (UE), comprising:
    a memory; and
    one or more processors, coupled to the memory, the memory storing instructions executable by the one or more processors to cause the UE to:
    adjust an amplifier of the UE to a highest gain state after a downlink period and before an uplink period;
    adjust the amplifier of the UE to a lower gain state after the uplink period and before a subsequent downlink period; and
    receive from a base station during the subsequent downlink period,
    wherein a latency associated with the receiving is reduced by adjusting the amplifier to the lower gain state
    wherein a latency associated with the receiving is reduced by adjusting the amplifier to the lower gain state.

14. The apparatus of claim 13, wherein the amplifier comprises a low-noise amplifier (LNA).

15. The apparatus of claim 13, wherein the downlink period comprises one or more downlink symbols within at least one slot.

16. The apparatus of claim 15, wherein the downlink period further comprises at least one flexible symbol within the at least one slot.

17. The apparatus of claim 13, wherein the uplink period comprises one or more uplink symbols within at least one slot.

18. The apparatus of claim 17, wherein the uplink period further comprises at least one flexible symbol within the at least one slot.

19. The apparatus of claim 13, wherein the amplifier is adjusted to the highest gain state after a final symbol of the downlink period.

20. The apparatus of claim 13, wherein the amplifier is adjusted to the highest gain state during a flexible symbol between the downlink period and the uplink period.

21. The apparatus of claim 13, wherein the amplifier is adjusted to the lower gain state after a final symbol of the uplink period.

22. The apparatus of claim 13, wherein the amplifier is adjusted to the lower gain state during a flexible symbol between the uplink period and the subsequent downlink period.

23. The apparatus of claim 13, wherein the instructions are further executable by the one or more processors to cause the UE to:

receive from the base station during the downlink period.

24. The apparatus of claim 13, wherein the instructions are further executable by the one or more processors to cause the UE to:

transmit to the base station during the uplink period.

25. An apparatus for wireless communication, comprising:

means for adjusting an amplifier of the apparatus to a highest gain state after a downlink period and before an uplink period;

means for adjusting the amplifier of the apparatus to a lower gain state after the uplink period and before a subsequent downlink period; and means for receiving from a base station during the subsequent downlink period, wherein a latency associated with the receiving is reduced by adjusting the amplifier to the lower gain state.

26. A non-transitory computer-readable medium storing one or more instructions for wireless communication, the one or more instructions, when executed by one or more processors of a user equipment (UE), cause the UE to:

adjust an amplifier of the UE to a highest gain state after a downlink period and before an uplink period;

adjust the amplifier of the UE to a lower gain state after the uplink period and before a subsequent downlink period; and receive from a base station during the subsequent downlink period, wherein a latency associated with the receiving is reduced by adjusting the amplifier to the lower gain state.

* * * * *